May 6, 1952 R. D. SLAYTON 2,595,714

ELECTRONIC MULTIPLEX TO START-STOP EXTENSOR

Filed June 24, 1950 4 Sheets-Sheet 1

FIG. I

INVENTOR
RANSOM D. SLAYTON
BY Emery Robinson
ATTORNEY

ELECTRONIC MULTIPLEX TO START-STOP EXTENSOR

Filed June 24, 1950 4 Sheets-Sheet 2

INVENTOR
RANSOM D. SLAYTON
BY Emery Robinson
ATTORNEY

INVENTOR
RANSOM D. SLAYTON
BY Emery Robinson
ATTORNEY

May 6, 1952 R. D. SLAYTON 2,595,714

ELECTRONIC MULTIPLEX TO START-STOP EXTENSOR

Filed June 24, 1950 4 Sheets-Sheet 4

INVENTOR
RANSOM D. SLAYTON
BY Emery Robinson
ATTORNEY

Patented May 6, 1952

2,595,714

UNITED STATES PATENT OFFICE 2,595,714

ELECTRONIC MULTIPLEX TO START-STOP EXTENSOR

Ransom D. Slayton, Lombard, Ill., assignor to Teletype Corporation, Chicago, Ill., a corporation of Delaware Application June 24, 1950, Serial No. 170,172

6 Claims. (Cl. 178—2)

Figure 1:
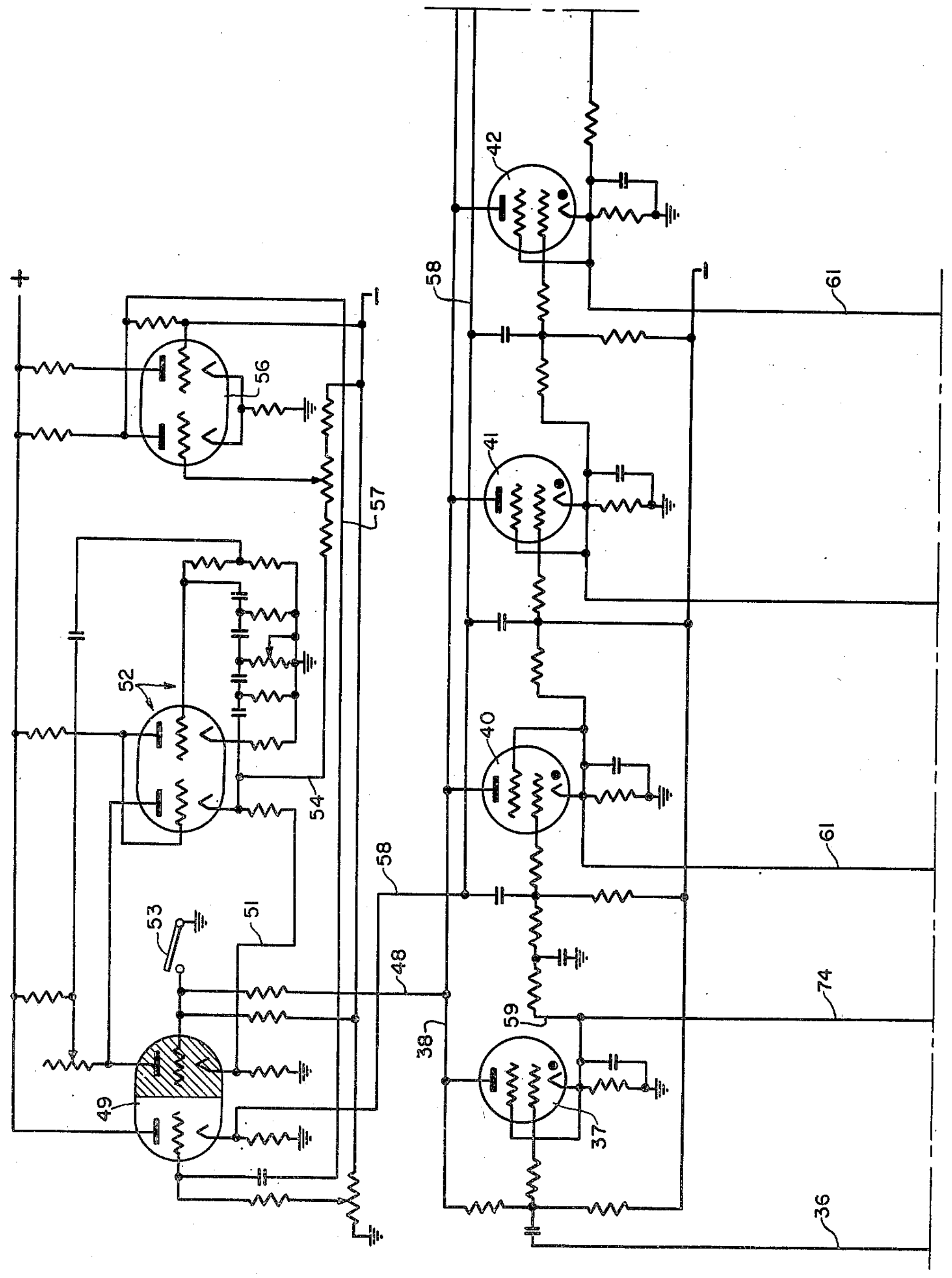

The present invention relates to telegraph converters and more particularly to an electronic converter for transposing multiplex to start-stop signals.

The use of converters for transposing a multiplex to start-stop code signal is not new in telegraph practice, it being done in many systems now in operation. The need for such conversion often occurs through the use of start-stop terminal equipment and multiplex linking channels wherein there are not sufficient individual start-stop circuits between the terminals and it is found desirable to use multiplexing facilities with each channel occupying only a portion of the usable circuit time. Also, the present trend of printing telegraph equipment is in the use of start-stop terminal equipment.

The prior known and utilized converters are mainly mechanical in nature and require a considerable amount of adjusting and regulating in order to operate efficiently. Further, in the use of mechanical apparatus there is constant wear and deterioration of parts, while mechanical characteristics place a limit to the speed of operation and accuracy of such devices.

Accordingly, an object of the present invention is to provide a multiplex to start-stop converter utilizing electronic devices as fully as possible.

Another object of the invention is to provide an electronic multiplex to start-stop converter which is low in initial cost and is free from the requirement of repeated adjusting.

Yet another object of the invention is to provide a converter which has few mechanical limitations.

A further object of the invention is to provide a converter having no elements operating during a period of failure of the associated multiplex circuit.

A further object of the invention is to provide an electronic converter utilizing a start-stop chain distributor controlled by a start-stop oscillator, which will not be released for operation except upon the receipt of a code signal.

Another object of the present invention is to provide a converter which under one setting will not be responsive to blank code signals but which under a second setting will receive and respond to the reception of blank code signals.

It might be mentioned that a somewhat similar electronic converter is illustrated and described in my copending application, Serial No. 54,776 filed on October 15, 1948, now Patent No. 2,536,578 issued on January 2, 1951. However, basic circuit techniques differ between the instant equipment and that disclosed in the pending application.

The converter, in general, comprises a series of vacuum triodes, forming conventional Eccles-Jordan flip-flop circuits, which are responsive to permutation impulses from the multiplex receiving apparatus. A series of matrix vacuum tubes are controlled from the initial circuits which store the signal combinations. A start-stop oscillator is released for operation through means operating in response to the reception of a code signal and the receipt of an operating impulse from the multiplex receiver to control a gas tube start-stop distributor of the chain type. The electronic distributor operates in conjunction with a series of vacuum mixer tubes, which are controlled by the matrix tubes, for impressing the multiplex signals to the start-stop line but with the addition of automatically inserted start and stop elements. Under a second condition provision is made for the release of the start-stop oscillator through a sixth pulse even though a blank code signal has been received, which under the above first condition would not release the oscillator for operation.

Figures 2, 5:
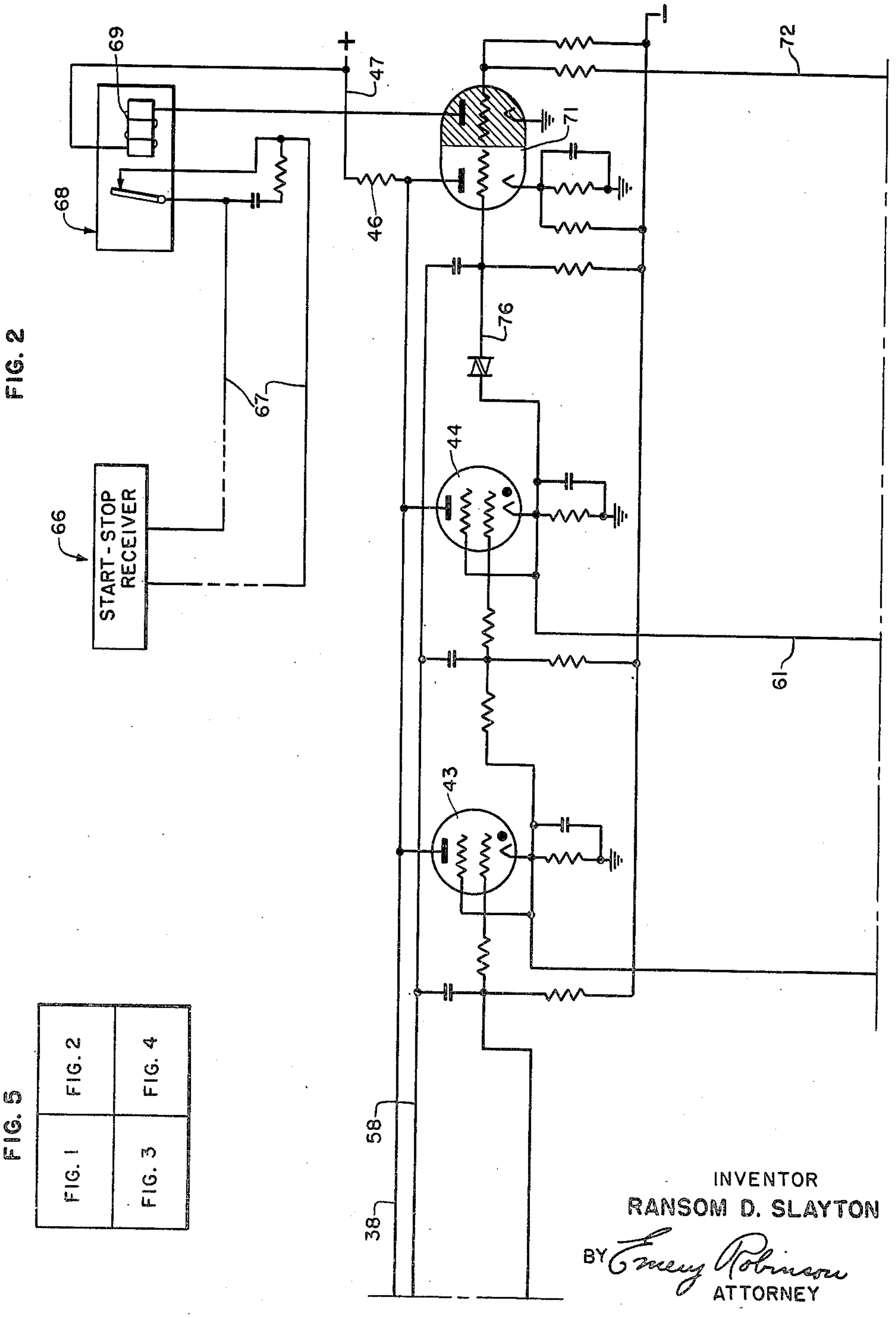

A more complete understanding of the invention may be had by reference to the following detailed description thereof when read in conjunction with the accompanying drawings, in which:

Figs. 1 to 4, inclusive, illustrate diagrammatically the components forming the present invention; and Fig. 5 illustrates in block diagram the correct positioning of Figs. 1 to 4, inclusive, to form an operative apparatus.

Figure 3:
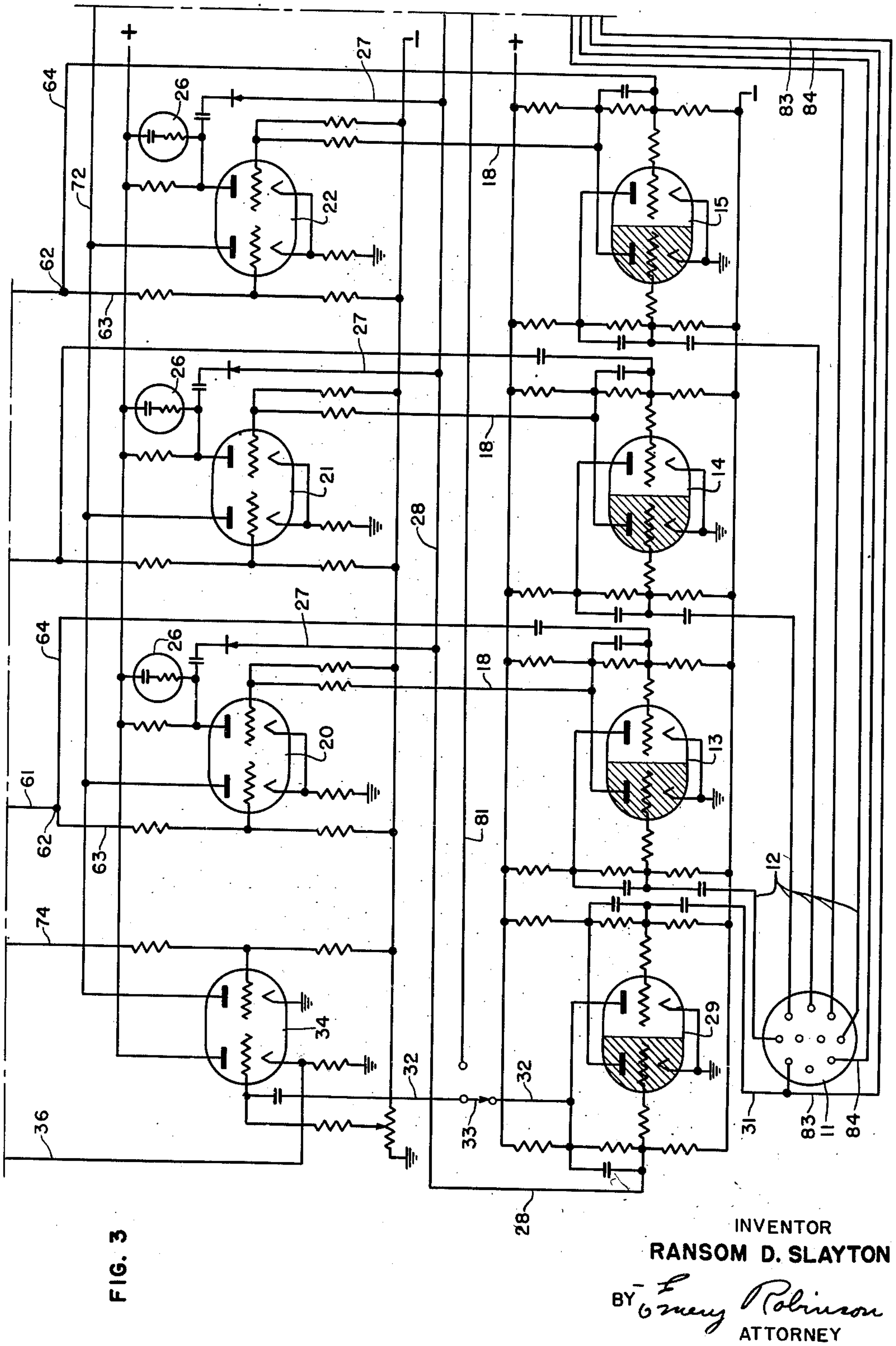
Figure 4:
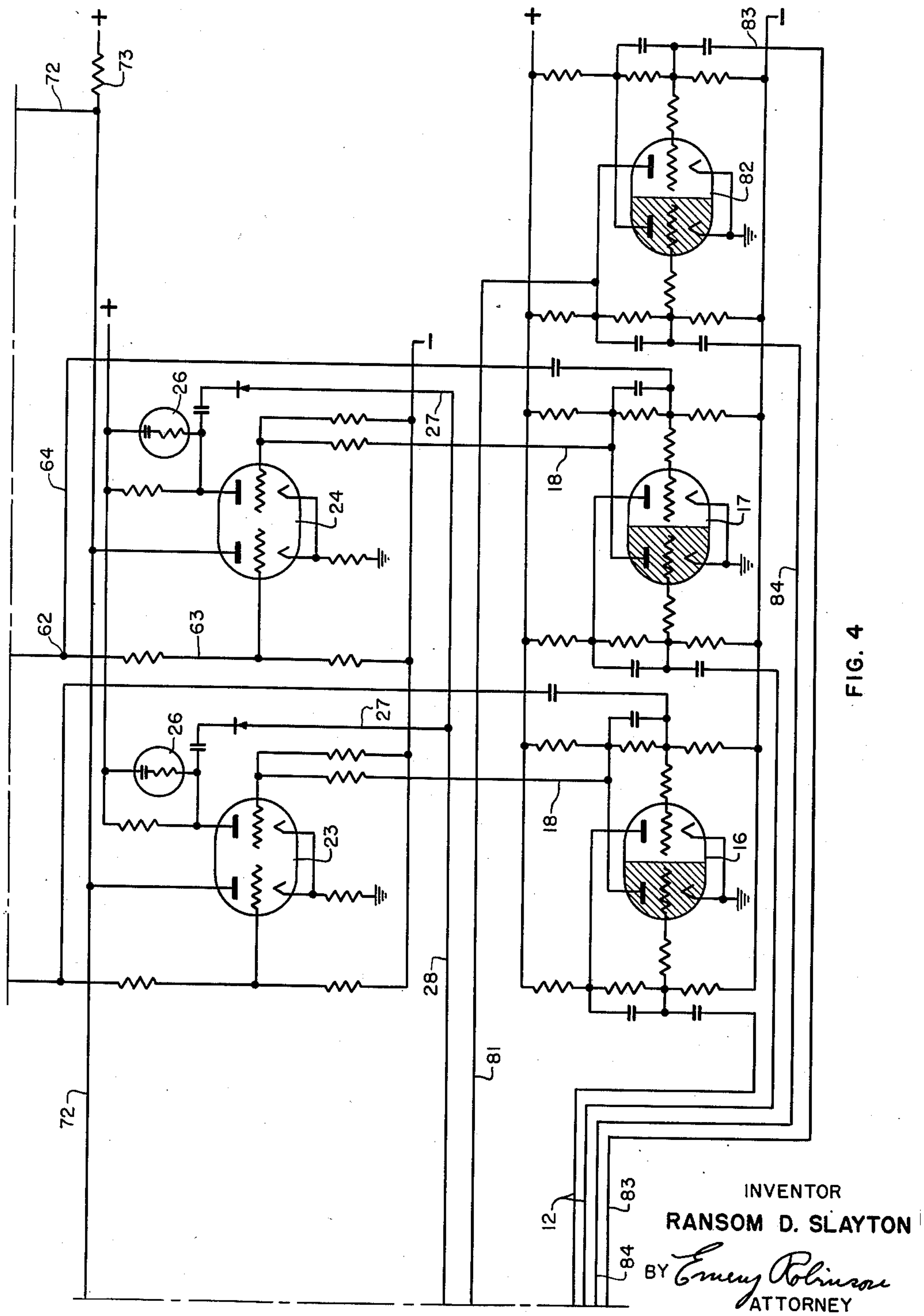

Referring to Fig. 3, a connector 11 is provided which is to be connected to an associated connector in the multiplex receiving distributor apparatus in conjunction with which the present apparatus is operating. Connected to the connector 11 are five conductors 12 which connect with the receiving distributor output for the instant channel, such conductors being connected in the well known mechanical multiplex system to the five receiving segments assigned to the code signal for the instant channel. The conductors 12 may also be connected to the conductors 1726 of the electronic receiving multiplex distributor disclosed in copending application Serial No. 54,772, filed on October 15, 1948, in the name of T. A. Hansen. If such latter connections are made the connector 11 will be connected with the connector 2003 in the cited application.

However, if either of the connections are made, as indicated above, it will be necessary to interpose relay circuits intermediate the mechanical unit and phase inverter tubes intermediate the electronic unit, as the instant apparatus requires negative marking impulses or potential on the conductors 12, as will appear hereinafter. As such expedients are well known in the art they will not be described further.

The conductors 12 are connected separately through individual condensers and resistors to the normally positively biased grids of the normally conducting left-hand sections of a plurality of vacuum twin triode tubes 13 to 17, inclusive. Therefore, as the individual impulses are received by the receiving multiplex apparatus and relayed to the instant apparatus, if a negative marking impulse is received on any conductor 12 it will cause the associated left-hand section of the tube 13 to 17 to be rendered nonconducting, whereas if a zero potential spacing impulse is received on any conductor 12 it will allow the associated left-hand section of the tube 13 to 17 to remain conducting.

It should be noted that the grids of the right-hand sections of the tubes 13 to 17, inclusive, are positively or negatively biased, depending upon the anode potential of the left-hand sections of the same tubes. The cathodes of the two sections are connected together and to ground, and, thus, at such time as a left-hand tube section is conducting, the cathode of the right-hand section will be positive with respect to its grid and the latter section will not conduct.

Further, the anodes and grids of the two sections of each of the tubes 13 to 17 are interconnected in such a manner that they form individual Eccles-Jordan circuits. It is not deemed necessary to describe in detail the operation of an Eccles-Jordan circuit, as this is well known, other than to say that one portion will conduct with the other portion nonconducting until such time as the conducting portion is rendered nonconducting, at which time the other portion is rendered conducting and continues to conduct. The two portions form, in effect, a flip-flop circuit.

In view of the above, if the left-hand sections of any of the tubes 13 to 17, inclusive, are rendered nonconducting by a negative impulse on its connecting conductor 12, the right-hand section thereof will become conducting. Once the right-hand section of any of the tubes 13 to 17 becomes conducting it will continue to do so until rendered nonconducting, in a manner as will be described hereinafter.

The anodes of the left-hand sections of the tubes 13 to 17 are each connected by branching conductors 18, through appropriate resistors to the normally negatively biased grids of the right-hand matrix section of twin-triode vacuum tubes 20 to 24, inclusive.

In the event that the left-hand section of any of the tubes 13 to 17, inclusive, is rendered nonconducting, the potential in its anode circuit will rise, thus supplying sufficient potential to its conductor 18 to cause the associated right-hand section of the corresponding tube 20 to 24, inclusive, to be rendered conducting. Once rendered conducting it will continue to do so until such time as the left-hand section of the associated tube 13 to 17 is again rendered conducting with a corresponding drop in potential on its conductor 18.

Each of the right-hand sections of the tubes 20 to 24 is provided with a signal lamp 26 in parallel with its anode load, so upon the associated tube becoming conducting the lamp 26 will be illuminated to indicate the reception of a marking signal condition.

To repeat briefly the operations thus far described, negative marking or zero spacing impulses are received from the multiplex receiver over the conductors 12 to the grids of the left-hand selector sections of the tubes 13 to 17, inclusive. A marking impulse will result in that left-hand section of the tube being rendered nonconducting, whereas a spacing impulse will have no effect on the normal conduction of the tube. The effect on the left-hand section of the tube will be reflected in the associated right-hand section, a marking impulse resulting in the right-hand section becoming conducting and a spacing impulse allowing it to remain nonconducting. Similarly, the right-hand matrix sections of the tubes 20 to 24, inclusive, will also be effected, becoming conducting on a marking impulse and remaining nonconducting for a spacing impulse. Thus, the stored signal condition of five impulses will be recorded in the right-hand sections of the tubes 20 to 24, inclusive.

The anodes of the right-hand sections of the tubes 20 to 24, inclusive, are connected through direct current blocking condensers and crystal rectifiers by individual conductors 27 to a common conductor 28, and then through a resistor to the normally positively biased grid of a normally conducting left-hand section of a twin-triode vacuum tube 29. Therefore, upon the right-hand section of any of the tubes 20 to 24 becoming conducting a negative pulse will result on its conductor 27 and on the conductor 28, causing the left-hand section of the tube 29 to be rendered nonconducting.

The right and left sections of the tube 29 also form an Eccles-Jordan circuit, so that upon the left-hand section being rendered nonconducting the right-hand section will be rendered conducting. At this time such change in conduction will not have any effect on the operation of the apparatus.

After the complete code signal of five impulses has been received and stored, a multiplex operating pulse will be directed to the instant apparatus through the connector 11 to a conductor 31. Such multiplex operating pulse may originate from a local segment if a segmented mechanical distributor is utilized, which is well known in existing telegraph practice. However, if the system disclosed in the mentioned T. A. Hansen application is utilized in conjunction with the present converter, with the connector 11 connected to the connector 2003, the conductor 31 will be connected to the conductor 2006.

Irrespective of the type of distributor used, it is necessary that the multiplex operating pulse impressed on the conductor 31 be negative in potential. Accordingly, relay circuits or tube inverter circuits may be used to obtain the negative pulses, in method similar to that used to obtain negative pulses on the conductors 12.

The negative operating pulse will be impressed over the conductor 31 and through a suitable condenser and resistor to the grid of the right-hand section of the tube 29, which section is conducting at this time. This will result in such section being rendered nonconducting, and since it forms a portion of the Eccles-Jordan circuit previously described, the left-hand section of the tube will be again rendered conducting.

Upon the right-hand section of the tube 29 being rendered nonconducting its anode potential will increase, which will result in an increase of potential on a branching conductor 32, through a manually operable switch 33 and through an appropriate condenser to the normally negatively biased grid of the normally nonconducting left-hand start pulse amplifier section of a twin-triode vacuum tube 34. The left-hand portion of the triode 34 will be rendered conducting, but momentarily only, as the condenser in the conductor 32 passes only a single sharp positive impulse.

During the interval of conduction of the left-hand portion of the tube 34, a positive potential impulse will be impressed from its output cathode circuit over a conductor 36 and through a suitable condenser and resistor to the moderately negatively biased control grid of a normally nonconducting gas filled distributor start tube 37, causing the latter to be rendered conducting. The anode of the tube 37 is connected by a common conductor 38 to the anodes of five gas filled distributor tubes 40 to 44, inclusive, and through a common anode resistor 46 and over a conductor 47 to a source of positive potential. If it is desired to obtain a complete description of the theory and operation of tube circuits including common anode resistors the same may be had by reference to U. S. Patent No. 2,412,642, issued to J. R. Wilkerson on December 17, 1946. However, the drop in potential of conductor 38, through the tube 37 conducting, will cause more negative bias to be applied to the control grid of the tube 37, preventing the tube from being again rendered conducting until the potential of the conductor 38 again rises; however the tube 37 is not extinguished at this time.

Prior to the time that the start tube 37 was rendered conducting, positive potential had been supplied over the conductor 47, through the common anode resistor 46, over the conductor 38 and over a conductor 48 branching therefrom to the grid of the right-hand oscillator control section of a twin triode vacuum tube 49. The grid circuit connects through another less effective resistor to negative battery. Under this condition, with positive bias on the grid of the tube, the right-hand section thereof is rendered conducting and continues in that state until the tube 37 is rendered conducting; the potential drop through common anode resistor 46 then removing the positive bias from the grid. At the time that the right-hand section of the tube 49 is conducting, positive blocking potential is impressed from its output cathode circuit over a conductor 51 to the cathode of the left-hand section of a start-stop oscillator indicated generally by the numeral 52. No detailed description of the start-stop oscillator nor its operation will be given at this time as the same may be had by reference to U. S. Patent No. 2,373,737, issued on April 17, 1945 to M. Artzt, wherein a complete description may be found. Also, the right-hand section of the tube 49 has its anode connected to the anode of the left-hand section of the tube in the oscillator 52 and, therefore, when the tube 49 conducts its low anode potential reduces the gain of the tube of the oscillator 52 which will thus be doubly blocked and prevented from oscillating.

It might be noted at this time that a normally open manually operable switch 53 is connected to ground and associated with the grid of the right-hand section of the tube 49. If the switch 53 were to be closed, placing the grid at ground potential, the right-hand portion of the tube 49 will be rendered nonconducting and the start-stop oscillator 52 will be released for operation. The distributor, however, would not operate unless a start impulse was received from control tube 29. This allowance for free running of the oscillator 52 is provided so that the oscillator may be calibrated and adjusted to its desired frequency output. Such a frequency measurement may be made by applying the continuous signal to the input terminals of a cathode-ray oscilloscope along with the signals from a source of known frequency. A variable resistor in the oscillator circuit allows frequency adjustment.

Referring again to the fact that the tube 37 was rendered conducting and the right-hand section of the tube 49 was rendered nonconducting, no further potential will be impressed on the conductor 51 to block operation of the start-stop oscillator 52. The oscillator 52 will, therefore, commence to operate with its sine wave output being directed over a conductor 54 and through a variable resistor to the normally negatively biased grid of the left-hand section of a twin triode squaring amplifier vacuum tube 56. The two sections of the tube 56 will operate in a manner well known in the art to direct a square wave over a conductor 57 to the normally negatively biased grid of the left-hand amplifier section of the tube 49 through a suitable condenser. The condenser modifies the transition points of the square wave to sharp positive and negative impulses, with the left-hand portion of the tube 49 conducting in response only to the positive pulses. The left-hand portion of the tube 49 will thus amplify a succession of positive pulses which occur in accordance with the transition points of the sine wave output of the oscillator, and which will be impressed over a common conductor 58 to the control grid circuits of the distributor tubes 40 to 44, inclusive.

During the interval that the start tube 37 is conducting, positive potential is impressed from its output cathode circuit and through suitable resistors forming a portion of a delay network over a conductor 59 to the normally well negatively biased control grid of the distributor tube 40. The tube 40 will not be rendered conducting at this time, however, as this potential on its control grid is not sufficient to raise the grid to a value allowing conduction. However, this potential will exist during the interval that the tube 37 conducts and may be considered as a conditioning potential. The conditioning potential does not appear instantaneously at the grid of the tube 40, but is delayed by the necessity of charging a condenser through the first resistor in the network.

As it was previously mentioned that the start-stop oscillator 52 is released for operation upon the rendering conductive of the tube 37, upon the first positive impulse being impressed upon the conductor 58 from the squaring tube 56 and the left-hand amplifier section of the tube 49, an operating potential will be impressed through a suitable condenser and resistor to the control grids of all of the tubes 40 to 44, inclusive. However, at this time the tube 40 will be the only distributor tube receiving a conditioning potential on its control grid and therefore will be the only tube of the group which will be rendered conducting. As the tube 40 is rendered conducting it extinguishes the tube 37 by means of the common anode resistor 46, as described in the aforementioned Patent 2,412,642, issued to Wilkerson.

The tubes 41 to 44, inclusive, are interconnected with their preceding tube in a manner similar to that in which the tube 40 is connected to the tube 37 so that at such time as any of the tubes 40 to 43, inclusive, are conducting, they supply conditioning potential to the control grid of their associated succeeding tubes 41 to 44, inclusive. With conditioning potential being applied to the grid of one of those tubes, that particular tube will be rendered conducting upon the receipt of the next distributor drive impulse on the conductor 58. The tubes 40 to 44, inclusive, will operate successively as described and thus from an electronic chain distributor. The condenser which retards the changes in potential in the network attached to conductor 59 prevents an untimely drive impulse from causing tube 40 to be rendered conducting. Such an impulse could occur shortly after tube 37 first conducts if the potentiometer in the grid circuit of the squaring amplifier tube 56 were improperly adjusted. The other tubes 41 to 44, inclusive, do not require a delaying circuit, since the remainder of the driving impulses are always properly spaced.

It was mentioned previously that each of the right-hand sections of the tubes 20 to 24, inclusive, was in a conducting or nonconducting state in accordance with the particular multiplex signal impulse received on the conductors 12, the tube being rendered conducting by a marking impulse and non-conducting by a spacing impulse. If it be assumed that a marking condition is stored in the right-hand section of the tube 20 it will be conducting, and positive potential will be impressed from its output cathode circuit to the cathode of the left-hand mixer section of the same tube. If, conversely, it be assumed that a spacing condition is registered at the right-hand section of the tube 20, such tube will not be conducting and no potential will be impressed to the cathode of the left-hand section of the tube, such cathode then being at ground potential.

During the interval of conduction of the tube 40 positive potential will not only be impressed from its output cathode circuit to the control grid of its succeeding tube 41, but also will be impressed over a conductor 61 to a junction point 62 and then over a conductor 63 through an appropriate resistor to the normally negatively biased grid of the left-hand mixer section of the tube 20.

It may be noted that at the time the tube 40 conducts positive potential will be impressed by way of the conductor 61 to the junction point 62 and over a conductor 64 to a condenser in the grid circuit of the right-hand section of the tube 13. However, the positive impulse which will be applied to the grid will not be of sufficient potential to cause that section of the tube 13 to be rendered conducting if it had not been conducting at the time. The tubes 41 to 44, inclusive, are similarly connected to the associated right-hand sections of the tubes 14 to 17, inclusive.

By reference to Fig. 2 it may be seen that a start-stop receiving device or recorder indicated generally by a numeral 66, which may be located either locally or at a distant point, is connected over conductors 67 to the contacts associated with a mechanical line relay indicated generally by the numeral 68. An operating winding 69 of the line relay 68 is connected to positive battery 47 at one side and on the other side to the anode of the normally conducting right-hand output mixer section of a twin-triode vacuum tube 71. The relay 68 is so biased that during the normal conducting condition of the right-hand section of the tube 71 a marking or current carrying condition will exist on the conductors 67, the battery being supplied at the receiver 66. The normal condition of battery or marking on the line is well known, and is utilized in start-stop telegraphy in order that a recording device may be held in an unoperative condition during intervals when no signals are being transmitted over the line or signalling channel. This is the same as a stop impulse or condition.

The grid of the right-hand section of the tube 71 is connected through a resistor to negative battery, and also by means of a conductor 72 to the anodes of the left-hand mixer sections of the tubes 20 to 24, inclusive, to the right-hand start mixer section of the tube 34, and through a common anode resistor 73 to positive battery. During the interval that the right-hand section of the tube 34 and the left-hand sections of the tubes 20 to 24, inclusive, are not conducting, positive potential will be applied from the source of positive battery through the common anode resistor 73 and over the conductor 72 to supply positive bias to the grid of the right-hand section of the tube 71. This is the normal idle condition for the various mentioned tubes and allows the relay 68 to be positioned, through the conduction of the right-hand section of the tube 71 to supply idle marking battery, or stop impulses, to the line conductors 67.

It is to be remembered that it was mentioned previously that with a signal stored in one or more of the right-hand selector sections of the tubes 20 to 24, inclusive, that upon receipt of the multiplex operating pulse over the conductor 31 the left-hand section of the tube 34 and the tube 37 would be rendered conducting. During the interval of conduction of the tube 37, which is equal to the telegraph code start impulse interval, potential will be impressed from its output cathode circuit over a conductor 74 to the normally negatively biased grid of the right-hand section of the tube 34. The right-hand section of the tube 34 will be rendered conducting during this interval, which through the connection to the common anode resistor 73 will result in a drop in potential on the conductor 72 with a resulting rendering nonconducting of the right-hand section of the tube 71. At this time the relay 68, through the cessation of current in its operating winding 69 will be biased or positioned to its opposite condition, resulting in a no current or spacing condition on the conductors 67, which is indicative of a start condition or impulse in start-stop telegraphy.

It has also been described how after an appropriate interval the tube 40 will be rendered conducting with the extinguishment of the tube 37, and the impression of potential to the grid of the left-hand section of the tube 20. Further, the left-hand section of the tube 20 will be rendered conducting for the No. 1 impulse interval, if a spacing condition exists in the right section of the tube 20. If the left-hand section of the tube 20 is thus conducting, a potential drop will occur on the conductor 72 through the connection to the common anode resistor 73, which will cause a condition in the right-hand section of the tube 71 and the relay 68 similar to the start impulse condition described above. Under this condition a no current or spacing condition will exist on the conductors 67.

If, instead, a marking condition exists in the No. 1 impulse right-hand selector section of the tube 20 at the time that the tube 40 is conducting and impressing potential over the conductors 61 and 63 to the grid of the left-hand section of the tube 20, such section will be blocked from conduction because of the positive potential impressed to its cathode. Under this condition a potential rise will occur from the positive source of battery and through the common anode resistor 73 to the conductor 72, thereby allowing the right-hand section of the tube 71 to conduct. Upon this occurrence the relay 68 will be positioned so as to apply battery or a marking condition to the conductors 67, similar to the stop condition described previously.

The tube 40 will remain conducting for an interval equal to the normal length of a signal impulse and thereafter upon the receipt of the next pulse from the oscillator 52 and subsequent circuits to the conductor 58 the tube 41 will be rendered conducting with the tube 40 becoming extinguished, all as described above. In the event that the left-hand section of the tube 20 had been conducting, signifying a spacing condition, it will be rendered nonconducting at the time that the tube 40 is extinguished.

Also, as the tube 40 is extinguished a negative pulse will result in its output cathode circuit which will be impressed on the conductors 61 and 64 to the grid of the right-hand section of the tube 13, causing the latter tube section to be rendered nonconducting if previously in a conducting condition. In this manner after the No. 1 impulse is transmitted the tube 13 will be returned to, or retained in, its normal condition awaiting the succeeding code signal.

Upon the tube 41 being rendered conducting its output cathode potential will be impressed to the grid of the left-hand section of the tube 21 in a manner similar to that described above. The left-hand section of the tube 21 will respond or will not respond in accordance with the signal element stored in the right-hand section of the tube, in a manner also similar to that described with respect to the tube 20.

The tube 41 will remain conducting for an interval equal to a signal impulse and thereafter the tubes 42 to 44, inclusive, will each conduct for predetermined intervals in chain fashion as described. During the intervals of conduction of the tubes 42 to 44 the left-hand mixer sections of the tubes 22 to 24 will be rendered conducting or nonconducting in accordance with the signal condition stored in the right-hand sections of the tubes 22 to 24. Also, during the interval of conduction of the tubes 41 to 44 and in accordance with whether the left-hand sections of the tubes 21 to 24 are rendered conducting or not conducting a similar condition as described previously will be reflected on the conductor 72 to control the right-hand section of the tube 71 and the output relay 68 in accordance with prior descriptions. Also, at the instants that the tubes 42 to 44 are rendered nonconducting the right-hand sections of the tubes 14 to 17 will be rendered nonconducting, if conducting at the time, to reset the left-hand sections of the same tubes to their normal conducting condition in readiness for the receipt of the impulses of the succeeding signal from the multiplex receiver.

At such time as the tube 44 is rendered conducting, such tube being assigned to the No. 5 impulse interval, its output cathode circuit will impress potential through a silicon-carbide varistor and over a conductor 76 to the normally negatively biased grid of the left-hand stop section of the tube 71. The output pulses from the start-stop oscillator 52 which are squared and amplified and impressed on the conductor 58 are impressed on the grid of the left-hand section of the tube 71. Thus, with the grid of that section of the tube receiving a conditioning potential from the distributor tube 44, upon the receipt of the next distributor drive impulse the left-hand section of the tube 71 will be rendered conducting. This operating pulse is received after an interval of conduction of the tube 44 sufficient for the transmission of the No. 5 code signal impulse. Upon the left-hand section of the tube 71 being rendered conducting the tube 44 will be extinguished through the use of the common anode resistor 46.

The left-hand section of the tube 71 will conduct momentarily only as it is a vacuum tube and receives but a single impulse through the condenser in the conductor 58 to its grid. However, such interval of conduction will be sufficient to extinguish the tube 44, as mentioned. As the left-hand section of the tube 71 is rendered nonconducting, potential will rise on the conductors 38 and 48 since no current will be drawn through the common anode resistor 46 to any of the tubes 37, 40 to 44, or 71. This potential rise will impress sufficient potential on the grid of the right-hand oscillator control section of the tube 49 to cause the latter section to be rendered conducting. Increased positive potential is then impressed from the cathode circuit of this tube section over the conductor 51 and reduced potential is impressed from its anode circuit, both causing a blocking of the operation of the start-stop oscillator 52, as described previously.

It might be mentioned at this time that with the system operating as described above, if a blank signal were to be received from the receiving multiplex apparatus, which consists of five spacing impulses, none of the right-hand sections of the tubes 13 to 17, inclusive, would be rendered conducting, nor would the associated right-hand sections of the tubes 20 to 24, inclusive, be rendered conducting. Further, the left-hand section of the tube 29 would not be rendered nonconducting, nor would its right-hand section be rendered conducting. Thereafter, upon receipt of the next negative multiplex operating pulse over the conductor 31 the right-hand section of the tube 29 will not be rendered nonconducting as it is already in that condition. Therefore, no positive impulse will be impressed over the conductor 32 to the grid of the left-hand section of the tube 34. That tube section will not be rendered conducting and so no positive potential will be impressed from its cathode output circuit and over the conductor 36 to the grid of the start tube 37, and so the tube 37 will not be rendered conducting. With this condition existing the start-stop oscillator 52 will not be released for a cycle of operation and the converter apparatus will not operate to impress the blank signal on the conductors 67. Therefore, with the apparatus operating as described above no blank signal conditions in the signal initiating means will be passed to the start-stop receiver 66.

If it now be assumed that the manually operable switch 33 be moved to its other or right-hand position the portion of the conductor 32 above the switch 33 will be connected through the switch 33 to a conductor 81 which extends to the anode of the normally nonconducting right-hand section of a twin triode vacuum tube 82. The normally negatively biased grid of the right-hand section of the tube 82 is connected by a conductor 83 to the conductor 31 on which is impressed the negative multiplex operating pulses, originating at the multiplex receiver. A condenser in conductor 83 blocks the direct current from the bias potential, but permits the potential transitions of the operating pulses to be applied to the grid of the right-hand section of the tube 82.

The normally positively biased grid of the left-hand section of the tube 82 is similarly connected by a conductor 84 to the connector 11, and thence to the multiplex receiver. The described position of the switch 33 is utilized in schemes of transmission where cipher signals which include the blank start-stop signal combination must be transmitted.

Under this scheme of operation a marking sixth pulse will be transmitted invariably following the five code signal impulses from the transmitting apparatus to the receiving multiplex apparatus for each bona fide character combination including the blank, and will appear as a negative impulse to the connector 11 and the conductor 84. Therefore, each time that the negative sixth pulse is received on the conductor 84 it will cause the normally conducting left-hand section of the tube 82 to be rendered nonconducting. The two sections of the tube 82 form an Eccles-Jordan flip-flop circuit, as described previously, so at this time the right-hand section of the tube 82 will be rendered conducting.

At some time subsequent to the receipt of the five signal impulses and the following sixth pulse the negative multiplex operating pulse will be received on the conductors 31 and 83 and the grid of the right-hand section of the tube 82. This will result in the right-hand section of the tube being rendered nonconducting, and the left-hand section of the tube being again rendered conducting.

As a result of the right-hand section of the tube 82 being rendered nonconducting a potential increase will result in its anode circuit, including the conductor 81. Such potential will be impressed from the conductor 81 to the switch 33 and thence over the conductor 32 to the grid of the left-hand section of the tube 34, causing it to be rendered conducting. Upon the left-hand section of the tube 34 becoming conducting potential will be impressed from its output cathode circuit and over the conductor 36 to the control grid of the start tube 37. The tube 37 will be rendered conducting, causing the right-hand oscillator control section of the tube 49 to be rendered nonconducting because of the potential drop in the common anode resistor 46. This will result in the apparatus being released for a cycle of operation, all as has been described previously.

It may also be noted that while the negative sixth pulse causes the operation of the Eccles-Jordan circuit formed by the tube 82 to be reversed from normal, with the right-hand section conducting and the left-hand section nonconducting, the subsequent multiplex operating pulse will cause the circuit to be operated a second time, again reversing the conduction of the sections. In this manner the tube is in a normal condition in readiness for the receipt of the succeeding sixth pulse.

From the above description it may be understood that the converter apparatus is released under the sole control of the sixth pulse, regardless of whether a marking condition exists for any of the five signal impulses. Therefore, even though a blank, all five code impulses spacing, signal condition may be received at the converter it will be released to impress such signal to the conductors 67 for use or recordation at the start-stop receiver 66. The start and stop impulses will be added to the blank signal in a manner similar as was described previously for a signal having a marking component. As mentioned above, the receipt of the sixth pulse is invariable to the converter apparatus upon the reception of each character combination presented originally to the multiplex receiver by distant transmitting apparatus. The sixth pulse is not, under the above embodiment, transmitted to the start-stop receiver 66 but serves solely for control purposes for the instant converter.

During idle periods or when the originating start-stop transmitter is sending at a slower character rate than the multiplex circuit is operating, there will be times when the sixth pulse will not be transmitted, and under these conditions, the tube 82 will not be operated to cause its right-hand section to conduct. The succeeding multiplex operating impulse applied to conductors 31 and 83 will cause no change in the condition of tube 82, and no positive impulse will be applied to conductor 81, switch 33 and conductor 32. The tube 34 will not conduct to cause the tube 37 to be rendered conducting, so the distributing apparatus remains at rest, transmitting an extended rest or stop marking condition to the start-stop receiver 66.

While specific embodiments of the invention have been illustrated and described it is obvious that the invention is not limited to such disclosures but that additions and modifications may be made thereto within the scope and spirit of the invention.

What is claimed is:

1. In a multiplex to start-stop converter in combination with a multiplex distributor, a start-stop distributor, a start-stop oscillator for operating said distributor, a plurality of pairs of tubes forming flip-flop circuits, each pair being assigned to one of the components of a multi-component code signal received from said multiplex distributor, each pair of tubes being reversed in conduction in response to its component being a marking condition, a plurality of tubes each one of which is associated with a pair of said tubes forming a flip-flop circuit and which is rendered conducting upon receipt of a marking condition by said flip-flop circuit, means jointly responsive to one of said second mentioned plurality of tubes being rendered conducting and to an impulse from said multiplex distributor for releasing said oscillator for operation, means controlled by said start-stop distributor for retransmitting the received multi-component received signals, and means to insert start and stop impulses to the retransmitted signal.

2. In a multiplex to start-stop converter in combination with a multiplex distributor, a start-stop distributor, a start-stop oscillator for operating said distributor, a plurality of pairs of tubes forming flip-flop circuits, each pair being assigned to one of the components of a multi-component code signal received from said multiplex distributor, each pair of tubes being reversed in conduction in response to its component being a marking condition, a plurality of tubes each one of which is associated with a pair of said tubes forming a flip-flop circuit and which is rendered conducting upon receipt of a marking condition by said flip-flop circuit, means jointly responsive to one of said second mentioned plurality of tubes being rendered conducting and to an impulse from said multiplex distributor for releasing said oscillator for operation, means controlled by said start-stop distributor for retransmitting the received multicomponent received signals, means to insert start and stop impulses to the retransmitted signal, and means controlled by said start-stop distributor for rendering nonconducting any of said second mentioned plurality of tubes which may have been rendered conducting.

3. In a multiplex to start-stop converter in combination with a multiplex distributor, a start-stop distributor, a start-stop oscillator for operating said distributor, a plurality of pairs of tubes forming flip-flop circuits, each pair being assigned to one of the components of a multi-component code signal received from said multiplex distributor, each pair of tubes being reversed in conduction in response to its component being a marking condition, a plurality of tubes each one of which is associated with a pair of said tubes forming a flip-flop circuit and which is rendered conducting upon receipt of a marking condition by said flip-flop circuit, means jointly responsive to one of said second mentioned plurality of tubes being rendered conducting and to an impulse from said multiplex distributor for releasing said oscillator for operation, means controlled by said start-stop distributor for retransmitting the received multi-component received signals, means to insert start and stop impulses to the retransmitted signal, and means controlled by said start-stop distributor for rendering nonconducting any of said second mentioned plurality of tubes which may have been rendered conducting and for reversing conduction in any one of said flip-flop circuits which was operated in response to a marking condition.

4. In a multiplex to start-stop converter in combination with a multiplex distributor, a start-stop distributor comprising a plurality of tubes, a start-stop oscillator for operating said distributor for causing said tubes to be rendered conducting successively, tube means for receiving signal conditions from said multiplex distributor, a plurality of secondary tubes controlled by said tube means for storing the received signal conditions, means jointly responsive to the storing of a signal condition in said plurality of secondary tubes and to an impulse from said multiplex distributor for releasing said oscillator for operation, a third plurality of tubes each under the joint control of one of said start-stop distributor tubes and one of said secondary tubes, means to retransmit signal conditions under the control of said third plurality of tubes, and means for inserting start and stop conditions to said retransmitting means for retransmission with said signal conditions.

5. In a multiplex to start-stop converter in combination with a multiplex receiver, a start-stop distributor, a start-stop oscillator for operating said distributor, a plurality of flip-flop tube circuits assigned to the intelligence portions of a multi-component code signal received from said multiplex receiver, a flip-flop tube circuit assigned to a control portion of said code signal received from said multiplex receiver, tube storage means controlled by said flip-flop tube circuits assigned to the intelligence portions of said signal, means jointly responsive to said flip-flop circuit assigned to the control portion of said signal and to an impulse from said multiplex receiver for releasing said oscillator for operation, means jointly responsive to said distributor and said tube storage means for retransmitting the intelligence portions of said signal, and means for inserting start and stop code conditions to said retransmitting means for retransmission with the signal.

6. In a multiplex to start-stop converter in combination with a multiplex distributor, a start-stop distributor comprising a plurality of tubes, a start-stop oscillator for operating said distributor for causing said tubes to be rendered conducting successively, tube means for receiving signal conditions from said multiplex distributor, a plurality of secondary tubes controlled by said tube means for storing the received signal conditions, means jointly responsive to the storing of a signal condition in said plurality of secondary tubes and to an impulse from said multiplex distributor for releasing said oscillator for operation, a third plurality of tubes each under the joint control of one of said start-stop distributor tubes and one of said secondary tubes, means to retransmit signal conditions under the control of said third plurality of tubes, a common anode resistor interconnecting said third plurality of tubes and said retransmitting means to ensure the transmission of the correct signal condition, and means for inserting start and stop conditions to said retransmitting means for retransmission with said signal conditions.

RANSOM D. SLAYTON.

REFERENCES CITED

The following references are of record in the file of this patent:

UNITED STATES PATENTS

| Number | Name | Date |
|---|---|---|
| 2,536,578 | Slayton | Jan. 2, 1951 |